(12) United States Patent
Tseng et al.

(10) Patent No.: US 8,908,364 B2
(45) Date of Patent: Dec. 9, 2014

(54) PORTABLE COMPUTER

(75) Inventors: Tien-Chung Tseng, New Taipei (TW); Ming-Ju Hsieh, New Taipei (TW); Chien-Yuan Lai, New Taipei (TW)

(73) Assignee: Wistron Corporation, New Taipei (TW)

( * ) Notice: Subject to any disclaimer, the term of this patent is extended or adjusted under 35 U.S.C. 154(b) by 147 days.

(21) Appl. No.: 13/617,013

(22) Filed: Sep. 14, 2012

(65) Prior Publication Data
US 2013/0128443 A1 May 23, 2013

Related U.S. Application Data

(60) Provisional application No. 61/561,312, filed on Nov. 18, 2011.

(30) Foreign Application Priority Data

Apr. 3, 2012 (TW) .............................. 101111902 A

(51) Int. Cl.
*H05K 7/00* (2006.01)
*G06F 1/16* (2006.01)
*H05K 5/00* (2006.01)
*F16M 11/00* (2006.01)

(52) U.S. Cl.
CPC ............ *G06F 1/1616* (2013.01); *G06F 1/1681* (2013.01); *Y10S 248/921* (2013.01); *Y10S 248/923* (2013.01); *Y10S 345/905* (2013.01)
USPC .................. 361/679.26; 361/679.27; 248/921; 248/923; 345/905; 349/58

(58) Field of Classification Search
CPC .................. G06F 1/16–1/1654; G06F 1/1656; G06F 1/1662–1/1681; G06F 1/1684–1/189; G06F 1/20; G06F 1/203; G06F 1/206; G06F 2200/201; G06F 2200/202; G06F 2200/203; H05K 5/00; H05K 5/0026; H05K 5/0082; H05K 5/0021; H05K 5/0086–5/06; H05K 5/069; H05K 7/005–7/08; H05K 7/20; H05K 7/00; H05K 7/1422; H05K 1/0218–1/0219; H05K 1/00; H05K 3/00; H05K 9/00; H01G 2/00; H01G 4/00; H01G 5/00; H01G 7/00; H01G 9/00–9/155; H01G 11/00; H02G 3/00; H02G 5/00; H02G 7/00; H02G 9/00; H02G 11/00; H02G 13/00; H02G 15/00; H01B 7/00; H01B 11/00; H01B 17/00; H01R 4/00; H01R 9/00; H01R 13/00; H01K 1/00; H01K 3/00; H02B 1/00; H01H 37/00
USPC ............... 361/679.55–679.56, 679.21–679.3, 361/679.01–679.61, 679.08–679.2, 361/679.26–679.27; 248/919–923, 176.1, 248/225.21; 345/905; 349/58
See application file for complete search history.

(56) References Cited

U.S. PATENT DOCUMENTS 5,251,096 A * 10/1993 Hosoi et al. ................... 361/695
(Continued)

FOREIGN PATENT DOCUMENTS

CN 2174715 Y 8/1994
(Continued)

OTHER PUBLICATIONS

Taiwan Patent Office, Office Action of corresponding Taiwan Application No. 101106214 (including 6 pages English translation of marked portion of pp. 1-8 of Office Action), issued Jun. 17, 2014, 16 pages.
(Continued)

*Primary Examiner* — Zachary M Pape
*Assistant Examiner* — Razmeen Gafur
(74) *Attorney, Agent, or Firm* — Alan Kamrath; Kamrath IP Lawfirm, P.A.

(57) ABSTRACT

A portable computer comprises a base, a display module, at least one support element and at least one sliding assembly. The base comprises a first area and a second area. The display module comprises a connect end and a display face. Each support element comprises a first end pivoted on a portion of the display module other than the display face and a second end pivoted on the rear end of the base. Each sliding assembly comprises a slide rail disposed at least in the second area and a sliding block connected with the connect end and moved along the slide rail. Each sliding block includes at least one stable structure for at least decreasing gaps between the slide rail and the sliding block.

22 Claims, 15 Drawing Sheets

(56) References Cited

U.S. PATENT DOCUMENTS

| | | | |
|---|---|---|---|
| 5,255,154 A * | 10/1993 | Hosoi et al. | 361/679.27 |
| 5,355,278 A * | 10/1994 | Hosoi et al. | 361/679.09 |
| 5,982,617 A * | 11/1999 | Haley et al. | 361/679.26 |
| 6,212,069 B1 * | 4/2001 | Janik et al. | 361/679.47 |
| 6,353,536 B1 * | 3/2002 | Nakamura et al. | 361/679.41 |
| 6,690,353 B2 * | 2/2004 | Chang | 345/156 |
| 7,130,186 B2 * | 10/2006 | Yu | 361/679.27 |
| 7,184,263 B1 | 2/2007 | Maskatia | |
| 7,203,058 B2 * | 4/2007 | Hong | 361/679.06 |
| 7,283,355 B2 * | 10/2007 | Han | 361/679.55 |
| 7,652,873 B2 * | 1/2010 | Lee | 361/679.06 |
| 7,804,679 B2 * | 9/2010 | Pischl | 361/679.04 |
| 8,259,437 B2 * | 9/2012 | Vesely | 361/679.01 |
| 8,649,166 B2 * | 2/2014 | Wu et al. | 361/679.27 |
| 8,724,316 B2 * | 5/2014 | Ou | 361/679.56 |
| 2005/0139740 A1 * | 6/2005 | Chen et al. | 248/286.1 |
| 2006/0077622 A1 | 4/2006 | Keely et al. | |
| 2007/0030634 A1 * | 2/2007 | Maskatia | 361/683 |
| 2007/0211420 A1 * | 9/2007 | Bang | 361/683 |
| 2010/0271770 A1 * | 10/2010 | Sellers | 361/679.08 |
| 2010/0309612 A1 | 12/2010 | Liang et al. | |

FOREIGN PATENT DOCUMENTS

| | | |
|---|---|---|
| CN | 1784133 A | 6/2006 |
| TW | 428174 U | 3/2001 |
| TW | 556583 U | 12/2003 |
| TW | 584227 U | 4/2004 |
| TW | M243748 U | 9/2004 |
| TW | 200707220 | 2/2007 |
| TW | M323952 U | 12/2007 |
| TW | 200815963 A | 4/2008 |
| TW | 200827832 A | 7/2008 |
| TW | M367554 | 10/2009 |
| TW | TWM398651 U | 2/2011 |
| TW | 201128355 A | 8/2011 |

OTHER PUBLICATIONS

Taiwan Patent Office, Office Action of corresponding Taiwan Application No. 101111902 (including 6 pages English translation of marked portion of pp. 1-11 of Office Action), issued Sep. 3, 2014, 20 pages.

* cited by examiner

PORTABLE COMPUTER

BACKGROUND OF THE INVENTION

1. Field of the Invention

The present relates to a portable computer, and more particularly, to a portable computer which can move a display towards a user and keep the display at a tilted angle.

2. Description of the Related Art

Computing devices have become an indispensable part of our daily life. With the fast development of touch technologies, most hand-held devices or electronic devices such as tablet PC, smart phone, and PDA now provide touch panels instead of mouse or keyboard as input devices, these devices are equipped with operating system supporting touch functions to enable intuitive and convenient operations.

As notebook PCs are usually equipped with QWERTY keyboards and touch pads for input functions and they also use operating system which does not support touch functions or interfaces which cannot recognize touch gestures, so few notebook PCs provide touch functions or designs in the past. However, as software vendors are rolling out new operating system which can support touch functions and people are becoming familiar with touch gestures required to operate tablet PCs or smart phones, it is now necessary for manufactures to provide touch functions on notebook PCs or even transform their notebook PCs into tablet PCs. Due to a certain weight of the display, when a user opens the display to a suitable angle relative to the base for touch operations, the display is kept in a fixed position by a reactive torsion of a pivot bearing between the display and the base; however, when the user touches the display, a torque generated by the applied force and the distance between the point of applied force and the pivot bearing would cause the display to vibrate back and forth, making it inconvenient for the user to perform any touch function and hard to see the display clearly. Furthermore, when the user applies too much force on the display, the display could topple and fall backwards without proper support, the display could be damaged to discourage the user to perform any touch function.

Therefore, a prior art technique discloses a support arm for supporting and pivotally connecting to the display.

In prior art technique such as Taiwan patent No. I316666 (U.S. Pat. No. 7,184,263B1), a portable computer uses a sheet-like support element to support a display and to let the display slide relative to the computer body via guide grooves on both sides of the keyboard to stand upright. However, this design can only apply for tablet PCs which have their displays faced upwards in a normal state and is not suitable for notebook PCs which usually have their displays faced down and towards a keyboard when not in use. Therefore, the patent is designed specifically for tablet PCs having their display exposed outwardly and allows the user to slide the display to a tilted angle for operations. However, the display is not well protected since it is exposed in any circumstances.

In another prior art technique such as Taiwan patent No. 566583, a notebook PC having its display rotatably moved relative to a base via a plurality of connecting rods to change a viewing angle for the user. However, this patent comprises complicated design which involves the operations of pivoting, linking and sliding and various linkage elements to work. Therefore, it is disadvantageous to assemble and to operate the mechanism. Besides, with a complicated mechanism and exposed support and linkage mechanisms on both sides of the display, it is aesthetically unpleasant and is possible to hurt the user if the user's finger accidentally gets pinched between these mechanisms. Additionally, the prior art technique requires reserved spaces for disposing grooves and pivoting mechanisms on both sides of the base, and it also require additional spaces for disposing support elements on both sides of the display case as well, so the whole thing tends to be bulky and thick, and it could sacrifice the viewable area of the display.

Therefore, it is necessary to provide a structure which can stably support the display and slide the display to a suitable angle for the portable computer.

SUMMARY OF THE INVENTION

It is an object of the present invention to provide a portable computer which can stably move a display towards a user and provide a supporting effect.

In order to achieve the above object, a portable computer of the present invention comprises a base, a display module, at least one support element, and at least one sliding assembly. The base comprises, between a front end and a rear end, a first area disposed at a front side of the base and a second area disposed at a rear side of the base. The display module comprises a connecting end, a display face, and a support plane opposite to the display face; each support element comprises a first fixed end and a second fixed end. The first fixed end is pivotally connected to a portion of the display module other than the display face, such that the display module can rotate relative to the support element; the second fixed end is pivotally connected to the rear side or a place adjacent to the rear side of the base such that the support element can rotate relative to the base. Each sliding assembly comprises a sliding block and a slide rail. The slide rail is disposed at least in the second area of the base; the sliding block is connected with the connecting end of the display module and can slide along the slide rail. The sliding block comprises at least one stable structure for at least decreasing a gap between the sliding block and the slide rail.

Accordingly, when the display module is opened and rotated to a suitable angle relative to the base via the second fixed end of the support element, the display module further rotates around the first fixed end with the first fixed end serving as a pivot point and simultaneously drives the connecting end to move from the second area towards the first area to a suitable position along with the sliding element; and then the display module is supported by the support element to keep a suitable tilted angle.

Through the design of the present invention, a user can turn the display module relative to the base to slide the connecting end of the display module towards the user to a suitable tilted angle via interactions between various pivoting elements and connecting rods. The display module is also supported by the at least one support element to provide a better viewing or operating effect for the user. Also, at least one stable structure is provided for decreasing the gap between the sliding block and the slide rail and the vibration generated during sliding, which makes the sliding process more stable and smooth.

BRIEF DESCRIPTION OF THE DRAWINGS

In the drawings, wherein similar reference numerals denote similar elements throughout the several views.

DETAILED DESCRIPTION OF THE PREFERRED EMBODIMENT

The advantages and innovative features of the invention will become more apparent from the following detailed description when taken in conjunction with the accompanying drawings.

Figure 1:
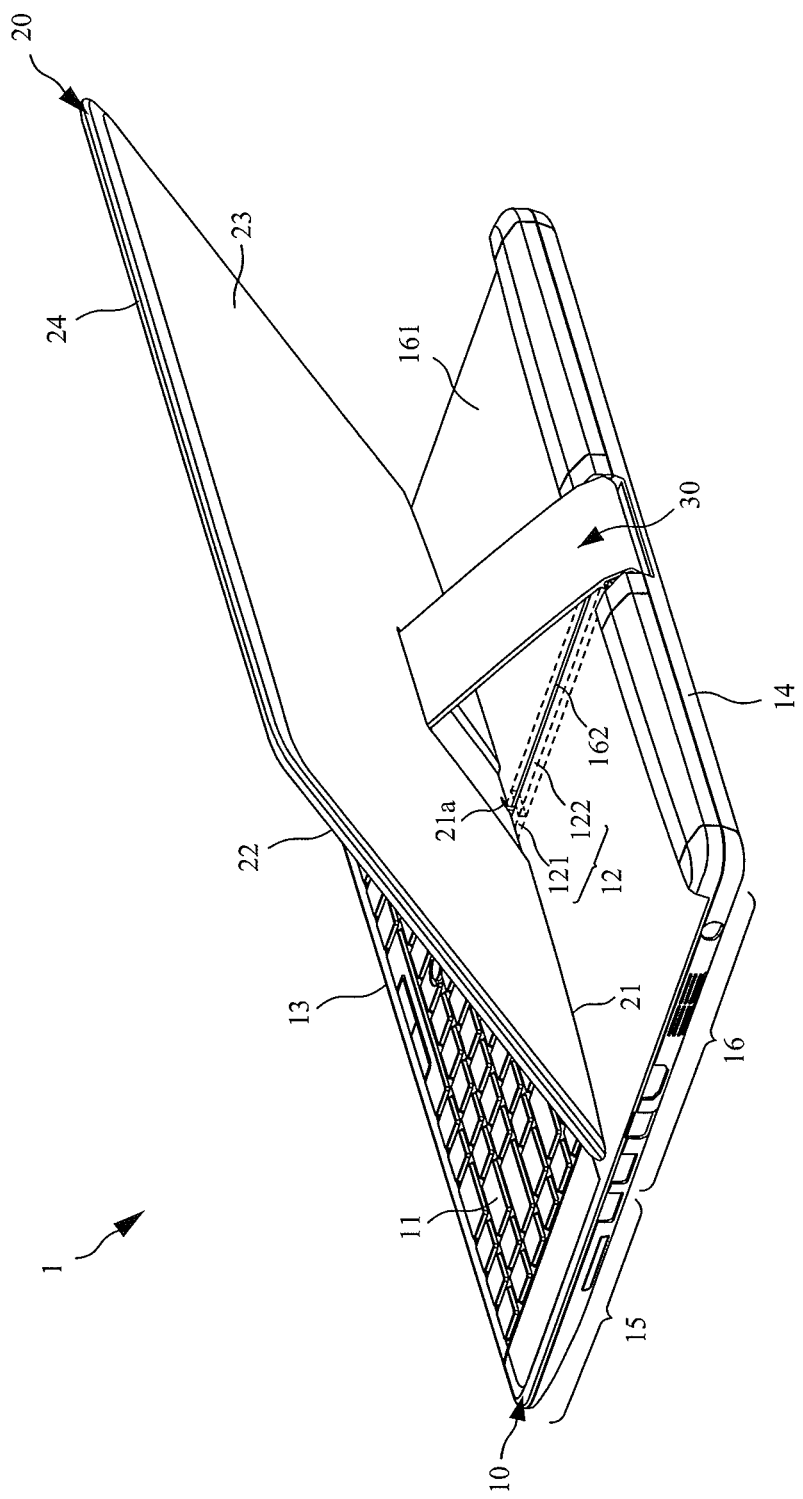
FIG. 1 illustrates a schematic view of a portable computer of the present invention.
Figure 2:
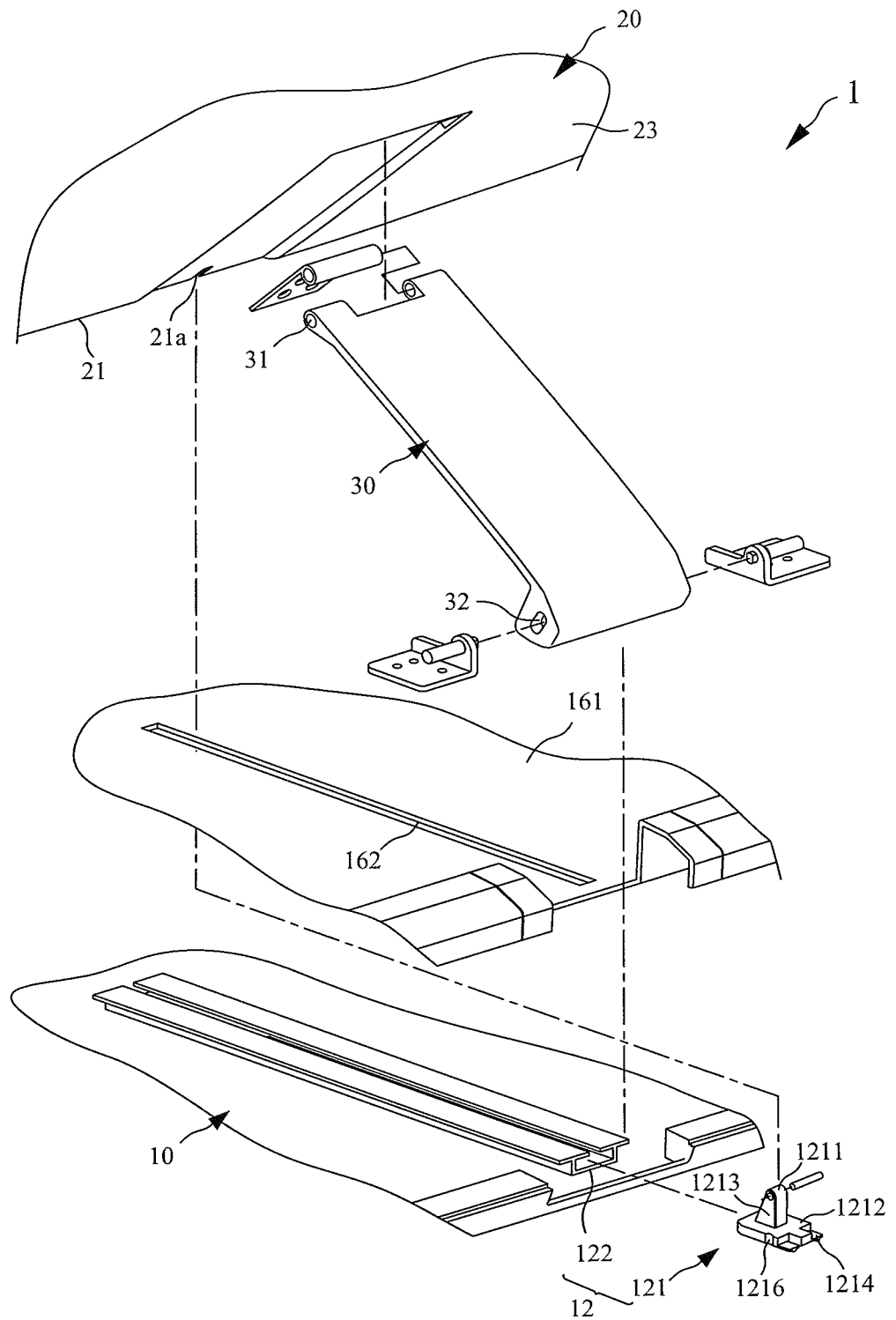
FIG. 2 illustrates a partial explosive view of a first embodiment of the portable computer of the present invention.

Please refer to both FIG. 1 and FIG. 2. FIG. 1 illustrates a schematic view of a portable computer 1 of the present invention; FIG. 2 illustrates a partial explosive view of a first embodiment of the portable computer 1 of the present invention. In an embodiment of the present invention, the portable computer 1 can be a notebook PC, but according to various application types, the portable computer 1 can also be a tablet PC, a mini laptop, or other electronic devices comprising flip-top type display modules without limiting the scope of the present invention.

As shown in FIG. 1 and FIG. 2, the portable computer 1 of the present invention comprises a base 10, a display module 20, and a support element 30. The interior of the base 10 is for disposing main computing components and related electronic components. The top of the base 10 is segmented into a first area 15 and a second area 16 between a front end 13 and a rear end 14; the first area 15 is disposed near the front end 13 and the second area 16 is disposed near the rear end 14. The first area 15 is provided for disposing a keyboard 11 or/and other input devices, such as touch pad or track point, and the second area 16 comprises a sliding assembly 12. In other embodiments, the sliding assembly 12 can extend forward to a part or all of the first area 15. It is noted that the sliding assembly 12 can be disposed in a central portion of the second area 16 or a substantially central portion of the second area 16.

The sliding assembly 12 comprises a sliding block 121 and a slide rail 122. The sliding block 121 combines sliding and pivotally connecting functions. The sliding block 121 can move along the slide rail 122 to slide in the second area 16 between the rear end 14 of the base 10 and the keyboard 11 with respect to the base 10. A slit 162 is disposed in the middle of the surface 161 of the second area 16, and the sliding assembly 12 is disposed at a position at the bottom of the second area 16 corresponding to the slit 162. In other embodiments, the sliding assembly 12 can also be extended from the second area 16 to the first area 15, such that the slit 162 is located on the surface of the second area 16 and a part or all of the first area 15, and the slide rail 122 can be correspondingly disposed below the surface of the second area 16 and the first area 15.

The display module 20 comprises a connecting end 21, a display face 22, a support plane 23, and a free end 24; the display face 22 is disposed opposite to the support plane 23, the connecting end 21 is opposite to the free end 24, and the display module 20 is pivotally connected to the sliding element 121 at the central portion 21a of the connecting end 21 via hinges or bearing elements to form a rotatable pivot point and so that the display module 20 is able to rotate relative to the sliding element 121. The display module 20 can have a display screen disposed in the display face 22 and supporting touch functions for receiving touch inputs from the user.

The support element 30 comprises a first fixed end 31 and a second fixed end 32, and the first fixed end 31 can be pivotally connected to the support plane 23 of the display module 20 via hinges to form a rotatable pivot point and so that the display module 20 rotate is able to relative to the support element 30. The second fixed end 32 can be pivotally connected to the rear end 14 of the base 10 via hinges to form another rotatable pivot point and so that the support element 30 rotate is able to relative to the base 10.

As shown in FIG. 2, in an embodiment of the present invention, the sliding block 121 of the sliding assembly 12 comprises a pivoting portion 1211, a sliding portion 1212, and a connecting portion 1213; the connecting end 21 of the display module 20 is rotatably pivoted to the sliding block 121 via the pivoting portion 1211. For instance, the pivoting portion 1211 can be a hinge element without torsion and can be rotated simply by a pin; or the pivoting portion 1211 can be a hinge element conventionally disposed between the display module and the base of a laptop and capable of generating torsion or suitable rotation friction. The sliding portion 1212 is connected to the pivoting portion 1211 via the connecting portion 1213; and the slide rail 122 of the sliding assembly 12 is provided for disposing the sliding portion 1212 of the sliding block 121. In this embodiment, the slide rail 122 is a groove-like slide rail, and the sliding portion 1212 is a block structure having its size fitted to the slide rail 122, so that the sliding portion 1212 can slide within the slide rail 122. However, the present invention is not limited thereto. Besides, according to different design requirements, the sliding portion 1212 further comprises at least one positioning portion 1216, such as a concave point. The positioning element (not shown, such as a convex spot) disposed by means of the positioning portion 1216 together with the slide rail 122, provides a positioning effect when the sliding block 121 moves to a certain point.

In order to comply with the uniformity and the sense of design of the portable computer 1, the slide rail 122 of the sliding assembly 12 is disposed below the surface 161 of the second area 16 of the base 10 and corresponds to the position of the slit 162 to be a hidden disposition. The structure of sliding block 121 of the sliding assembly 12 corresponds to the slit 162 of the surface 161 of the base 10. The slit 162 have a width smaller than the sliding portion 1212 and not smaller than a thickness of the connecting portion 1213. However, the width of the slit 162 can be smaller than the thickness of the connecting portion 1213 when elastic material, such as flannel, applied in the structure of the slit 162. Therefore, the connecting portion 1213 of the sliding block 121 can go through and move along the slit 162, and allows the pivoting portion 1211 to protrude out of the surface 161 of the base 10, so that the connecting end 21 of the display module 20 and the pivoting portion 1211 can be pivotally connected to each other. With this design, apart from the exposed pivoting portion 1211 of the sliding block 121 and a part of the connecting portion 1213, the other portion of the sliding block 121 and the slide rail 122 can be hidden below the surface 161 of the base 10. The exposed pivoting portion 1211 and the surface 161 of the base 10 are spaced apart by the partially exposed connecting portion 1213 to keep a spacing, so the display module 20 pivotally connected to the pivoting portion 1211 can rotate smoothly without being interfered by the base 10. Therefore, the present invention can provide an overall aesthetic appearance, and cannot affect the operations between the sliding block 121 and the display module 20.

Figure 3B:
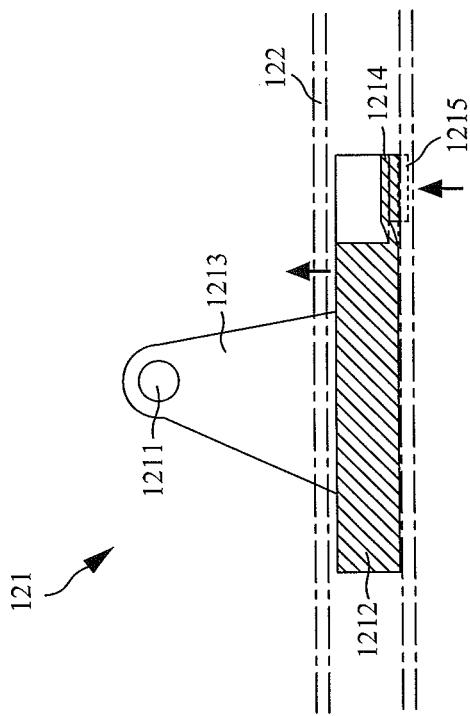
FIG. 3(b) illustrates a side view of the first embodiment of the sliding block of the portable computer within a slide rail.
Figure 3A:
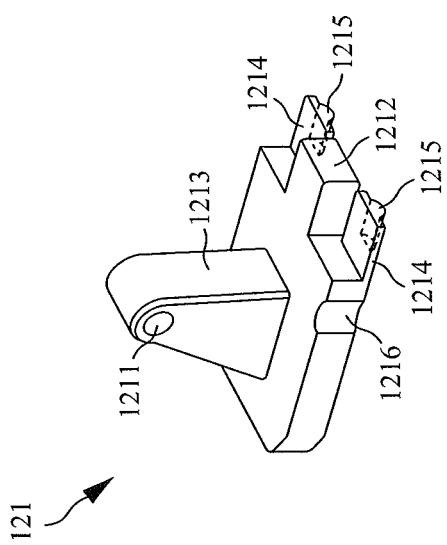
FIG. 3(a) illustrates a schematic view of the first embodiment of a sliding block of the portable computer of the present invention.

Please refer to both FIG. 3(a) and FIG. 3(b). FIG. 3(a) illustrates a schematic view of the first embodiment of a sliding block 121 of the portable computer of the present invention; FIG. 3(b) illustrates a side view of the first embodiment of the sliding block 121 of the portable computer within a slide rail 122. As shown in FIG. 2 and FIG. 3(a), when the sliding block 121 moves along the slide rail 122, a gap between the sliding portion 1212 of sliding block 121 and the slide rail 122 may cause component vibration, abnormal noise or sliding. Accordingly, the sliding block 121 of the present invention further comprises at least one stable structure 1214 disposed on the sliding portion 1212 for decreasing a gap between the sliding portion 1212 and the slide rail 122. In this embodiment, the stable structure 1214 is at least one elastic arm structure, wherein each elastic arm structure comprises a arm body and a protruding structure 1215 disposed in the arm body. The arm body extends outward from one side of the sliding portion 1212; for example, the arm body extends outward along the rear side of the sliding portion 1212, that is, the plane substantially the same as the bottom side. However, the present invention is not limited thereto. The protruding structure 1215 is disposed toward one side of the slide rail in contact with the bottom side of the sliding portion 1212. The protruding structure 1215 has a height lower than the bottom side of the sliding portion 1212. For example, the protruding structure 1215 of the stable structure 1214 in FIGS. 3(a) and 3(b) adopts a protruding stripe structure; however, the protruding structure in the present invention is not limited to this embodiment and can be replaced by other structures in different shapes, such as a convex or bump.

As shown in FIG. 3(b), when the sliding block 121 is disposed within the slide rail 122, the bottom of the sliding portion 1212 of the sliding block 121 may contact the internal wall under the slide rail 122, and a certain gap may be formed between the top of the sliding portion 1212 and the internal wall above the slide rail 122. By the at least one stable structure 1214, the protruding structure 1215 of the stable structure 1214 is disposed lower than the bottom of the sliding portion 1212. When the sliding block 121 is disposed within the slide rail 122, the protruding structure 1215 of the stable structure 1214 can first contact the internal wall under the slide rail 122, such that the elastic arm structure will be elastically deformed (like dotted lines changed into solid lines shown in the figure). Then, the sliding portion 1212 can allow the protruding structure 1215 to be used as a pivot and the arm body to be used as the arm, such that an impulse force as shown in the direction of the arrow can be formed from one side of the sliding portion 1212 close to the stable structure 1214. The sliding portion 1212 can move towards the internal wall above the slide rail 122 and then against the internal wall, by which the gap between the sliding portion 1212 and the slide rail 122 will be filled up. By the design of the stable structure 1214, the shock absorption and elimination of abnormal noise can be achieved, and the operating smoothness and stability of the sliding block 121 moved along the slide rail 122 can be improved.

Figures 4A, 4B:
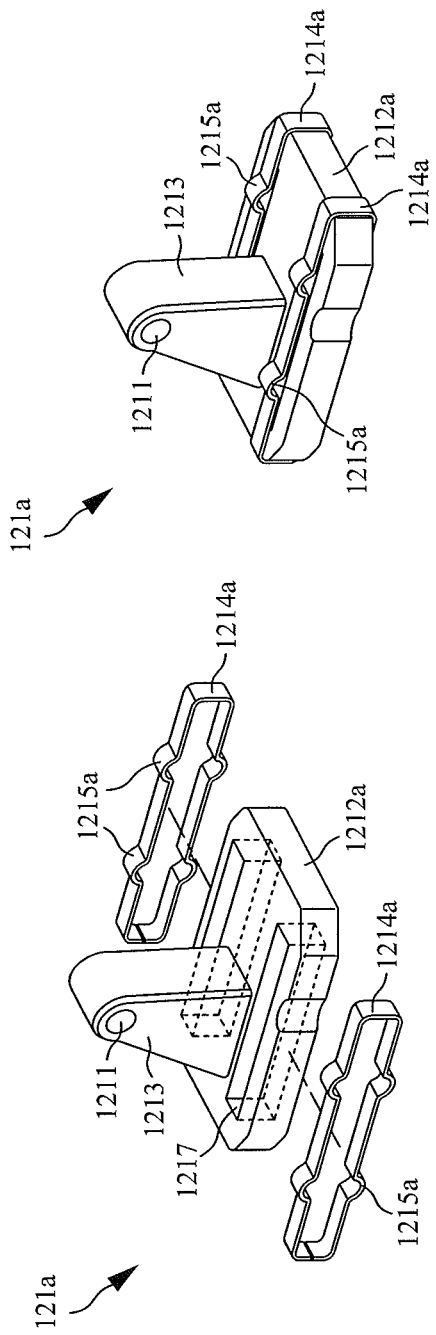
FIG. 4(a) illustrates an explosive view of a second embodiment of a sliding block of the portable computer of the present invention.
FIG. 4(b) illustrates a schematic view of the second embodiment of the assembling of the sliding block of the portable computer of the present invention.
Figure 4C:
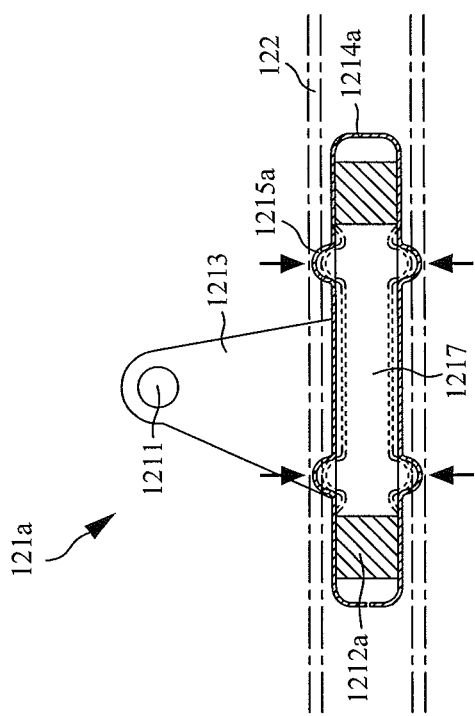
FIG. 4(c) illustrates a side view of the second embodiment of the sliding block of the portable computer within a slide rail.

Please refer to all FIG. 4(a), FIG. 4(b), and FIG. 4(c). FIG. 4(a) illustrates an explosive view of a second embodiment of a sliding block 121a of the portable computer of the present invention; FIG. 4(b) illustrates a schematic view of the second embodiment of the assembling of the sliding block 121a of the portable computer of the present invention; FIG. 4(c) illustrates a side view of the second embodiment of the sliding block 121a of the portable computer within a slide rail 122. The present embodiment is a variation of the first embodiment described above. As shown in FIG. 4(a) and FIG. 4(b), in this embodiment, the stable structure 1214a of the sliding portion 1212a is at least one elastic sheet structure disposed on the outer surface of the sliding portion 1212a. Each elastic sheet structure comprises at least one protruding structure 1215a, and each protruding structure 1215a is protruding from the outer surface of the sliding portion 1212a. The sliding portion 1212a further comprises at least one groove 1217. At least one protruding structure 1215a of each elastic sheet structure is correspondingly disposed at the location of each groove 1217, such that the protruding structure 1215a can move towards the inside of the groove 1217 when the protruding structure 1215a is forced. In this embodiment, the elastic sheet structure is a pair of ring-shaped elastic sheets trapped respectively on two sides of the sliding portion 1212a. The grooves 1217 are disposed respectively on upper and lower surfaces of the sliding portion 1212a, and the protruding structures 1215a of the ring-shaped elastic sheet are corresponding to the locations of the grooves 1217 at upper and lower surfaces of the sliding portion 1212a. The protruding structures 1215a are a plurality of convex structures formed by bending the stable structure 1214a at the location corresponding to the groove 1217 and protruded from the outside surface of the sliding portion 1212b. However, the structural form is not only limited to this embodiment.

As shown in FIG. 4(c), if the overall height of the sliding portion 1212a of the sliding block 121a is smaller than the height of the receiving space of the slide rail 122, a gap will be formed between the top of the sliding portion 1212a and the internal wall above the slide rail 122. Accordingly, in this embodiment, the overall height combing the sliding portion 1212a and the protruding structure 1215a of the stable structure 1214a is not less than the receiving space of the slide rail 122. When the sliding block 121a is within the slide rail 122, the protruding structure 1215a of the stable structure 1214a outside the sliding portion 1212a will be compressed and elastically deformed, such that the protruding structure 1215a can move toward the groove 1217. At this time, by the elasticity of the elastic sheet structure, each protruding structure 1215a of the stable structure 1214a can still contact with the internal wall below/above the slide rail 122 (like the dotted lines shown in the figure). Then the gap between the sliding portion 1212a and the slide rail 122 can be filled up by the stable structure 1214a. By the design of the stable structure 1214a, the second embodiment can provide the same effect of the shock absorption and elimination of abnormal noise as the first embodiment, and the operating smoothness and stability of the sliding block 121a moved along the slide rail 122 can be improved. Meanwhile, since the sliding portion 1212a is only in contact with the slide rail 122 by each protruding structure 1215a, and the contact area between the sliding portion 1212a and the slide rail 122 can be reduced obviously to decrease friction.

Figure 5A:
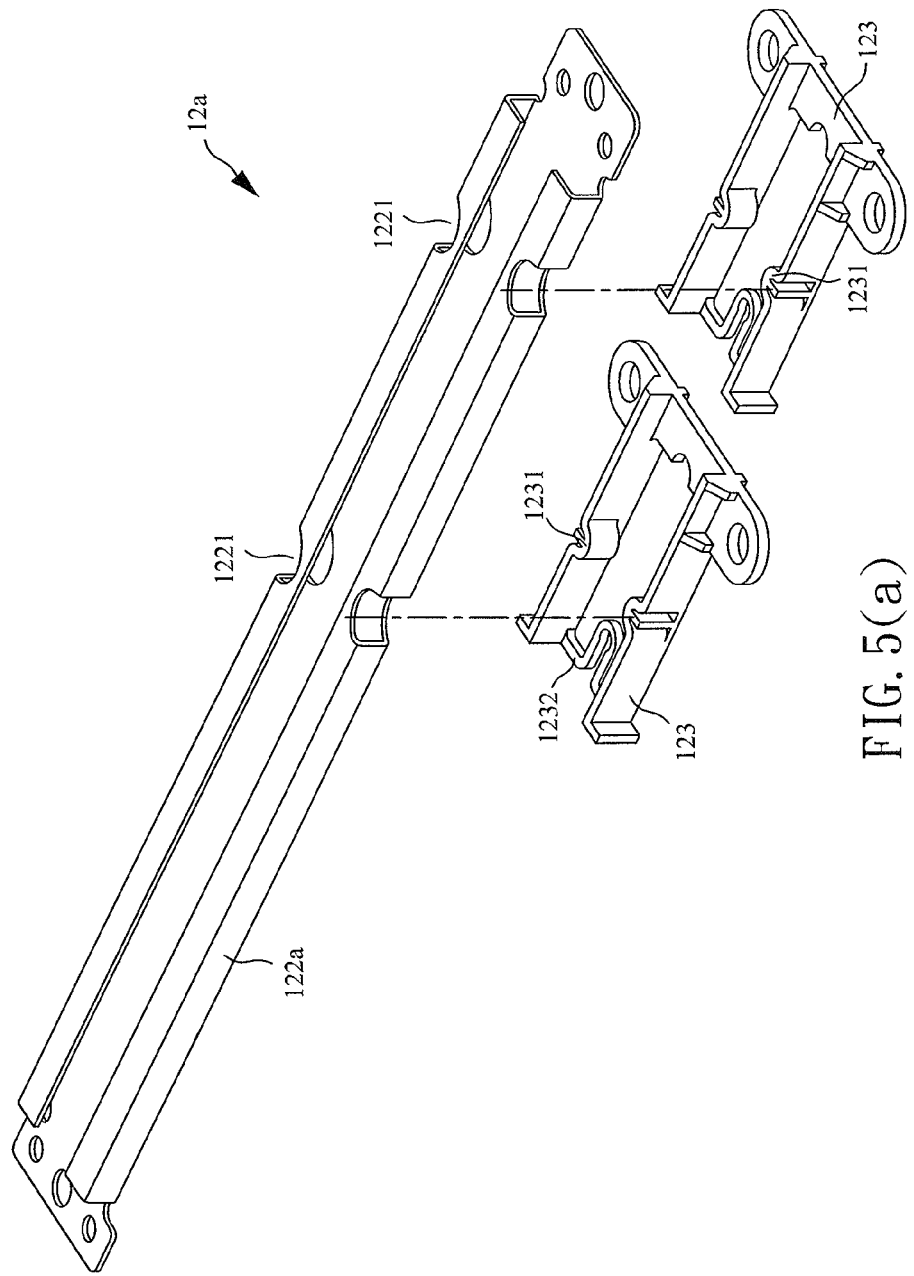
FIG. 5(a) illustrates a schematic view of another embodiment of a slide rail of the portable computer of the present invention.
Figure 5B:
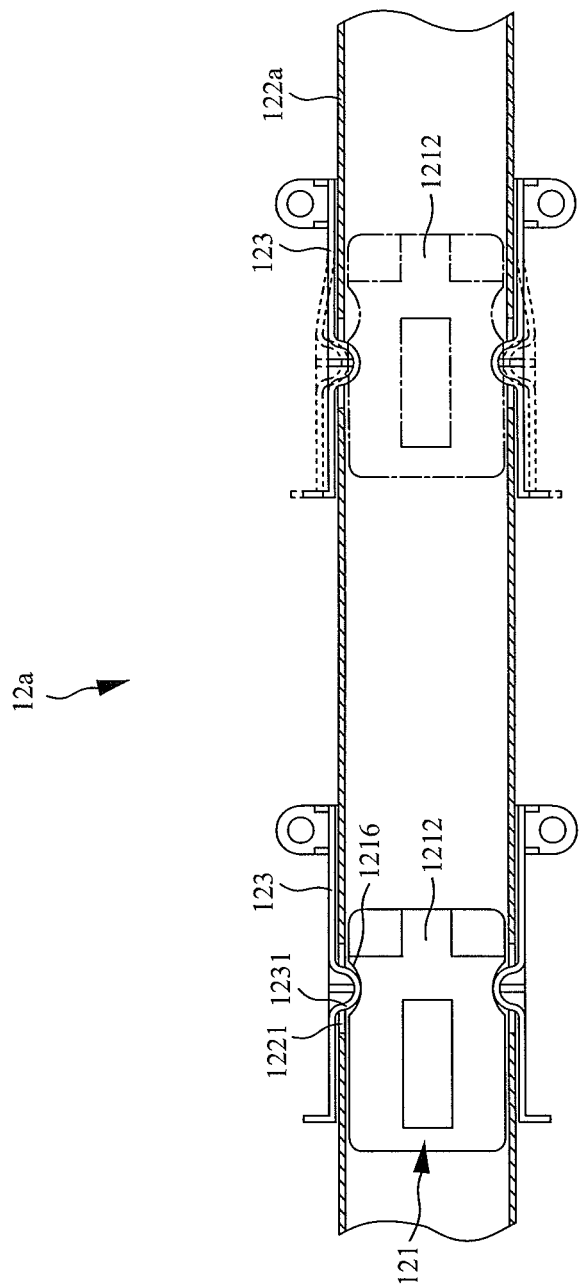
FIG. 5(b) illustrates an operating view of another embodiment of a sliding assembly of the portable computer of the present invention.

Please refer to both FIG. 5(a) and FIG. 5(b). FIG. 5(a) illustrates a schematic view of another embodiment of a slide rail 122a of the portable computer of the present invention; FIG. 5(b) illustrates an operation view of another embodiment of an sliding assembly 12a of the portable computer of the present invention. The present embodiment is a variation of the first embodiment described above, and the slide rail 122a is designed to use with the sliding block described in each forgoing embodiment. For example, the slide rail 122a of this embodiment is used with the sliding block 121 of the first embodiment described above. It is noted that, as the design described above, the slide rail 122a in FIG. 5(a) and FIG. 5(b) is disposed below the surface of the base (not shown), but the base and its surface is not illustrated in the figures for clearly showing the operation of the sliding assembly 12a.

As shown in FIG. 5(a), in this embodiment, the sliding assembly 12a further comprises at least one positioning element 123. Each positioning element 123 has at least one positioning structure 1231, such as a convex-like spot or interference element, and each positioning element 123 provides the elastic positioning function by means of disposing the elastic structure 1232 or the elasticity of the positioning element 123. Each positioning element 123 should be disposed at a corresponding fixed point on the slide rail 122a, and the location of the fixed point is based on the tilted angle of the display module as the display module slides with the sliding block. An opening 1221 can be disposed in the slide rail 122a corresponding to the corresponding fixed point. The positioning structures 1231 of the positioning element 123 can pass through the opening 1221 of the sliding rail 122a and protrude into the sliding rail 122a.

As shown in FIG. 5(b), the sliding portion 1212 of the sliding block 121 can slide within the slide rail 122a. When the sliding portion 1212 slides to any fixed point disposed with the positioning element 123, the sliding portion 1212 can achieve the positioning effect via the interactive interference of its own positioning portion 1216 and the positioning structure 1231 of the positioning element 123. With the disposition of the elastic structure, each positioning element 123 can return to its original condition after the sliding portion 1212 is departed away or passes by. Accordingly, the positioning function can be provided by any fixed point at which the display module slides with the sliding block 121 on the slide rail 122a.

Figure 6:
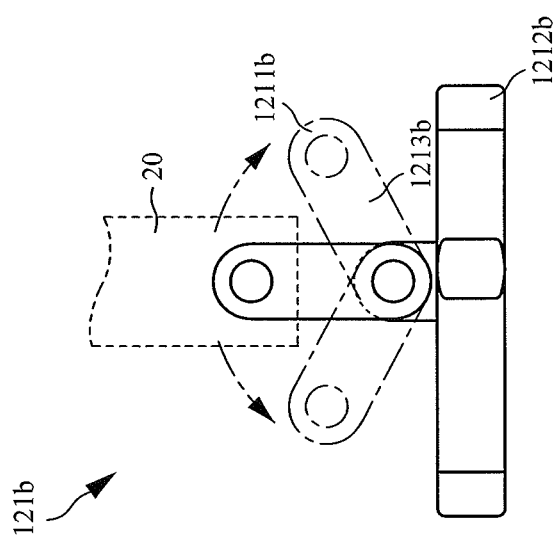
FIG. 6 illustrates a schematic view of a third embodiment of a sliding block of the portable computer of the present invention.

Please refer to FIG. 6 which illustrates a schematic view of a third embodiment of a sliding block 121b of the portable computer of the present invention. The present embodiment is a variation of the first embodiment described above. It is noted that the structures and operations of the present embodiment can also be applied to the sliding blocks in the other embodiments described above and are not limited to this embodiment. As shown in FIG. 6, in this embodiment, the connecting portion 1213b and the sliding portion 1212b of the sliding block 121b are pivotally connected with each other to form a rotatable pivot point, such that the connecting portion 1213b can rotate relative to the sliding portion 1212b. One end of the connecting portion 1213b is pivotally connected to the display module 20 by the pivoting portion 1211b, and another end of the connecting portion 1213b is pivotally connected to the sliding portion 1212b. When the display module 20 is forced to rotate, by the dual pivot design of combining the connecting portion 1213b and the pivoting portion 1211b, the moment arm of the dragged sliding portion 1212b can be decreased, and the sliding smoothness and stability of the sliding block 121b can be increased.

Figure 7:
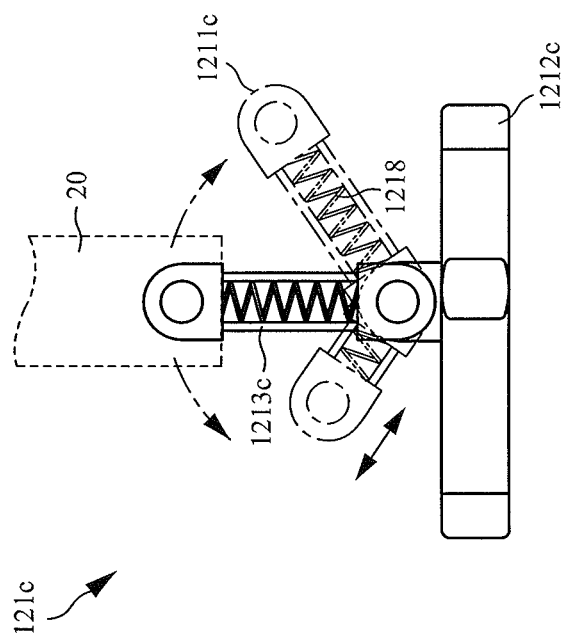
FIG. 7 illustrates a schematic view of a fourth embodiment of a sliding block of the portable computer of the present invention.

Please refer to FIG. 7 which illustrates a schematic view of a fourth embodiment of a sliding block 121c of the portable computer of the present invention. The present embodiment is a variation of the third embodiment described above. It is noted that the structures and operations of the present invention can also be applied to the sliding block in the other embodiments described above and are not limited to this embodiment.

As shown in FIG. 7, in this embodiment, the connecting portion 1213c of the sliding block 121c is not only pivotally connected with the sliding portion 1212c, but the connecting portion 1213c further comprises an extendable structure 1218. With the disposition of the extendable structure 1218, the length of the connecting portion 1213c can be adjusted. In addition to reducing the moment arm of the sliding portion 1212c as it is dragged, the distance between the display module 20 and the surface of the base can be increased after extending the length of the connecting portion 1213c by the extendable structure 1218. It can also avoid the interference generated between the display module 20 and the base. Furthermore, the extendable structure 1218 can also comprise an elastic member such as a spring to provide the extendable structure 1218 with the elastic buffer function, which further enhances the sliding smoothness and stability of the sliding block 121c.

Figure 8A:
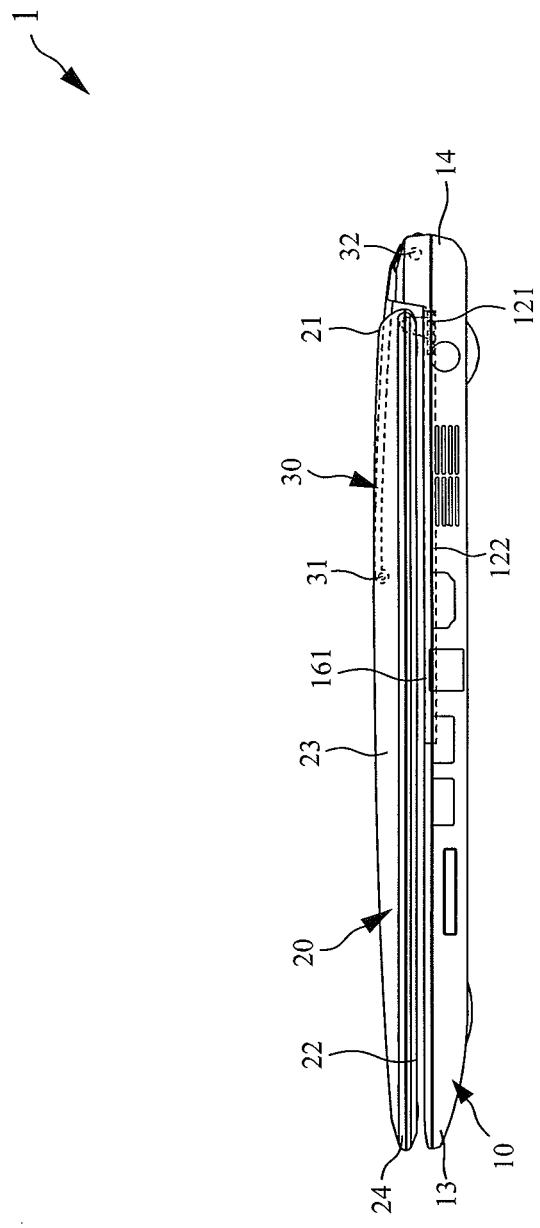
FIG. 8(a) illustrates a schematic view of the first embodiment of the portable computer of the present invention in a closed state.
Figure 8B:
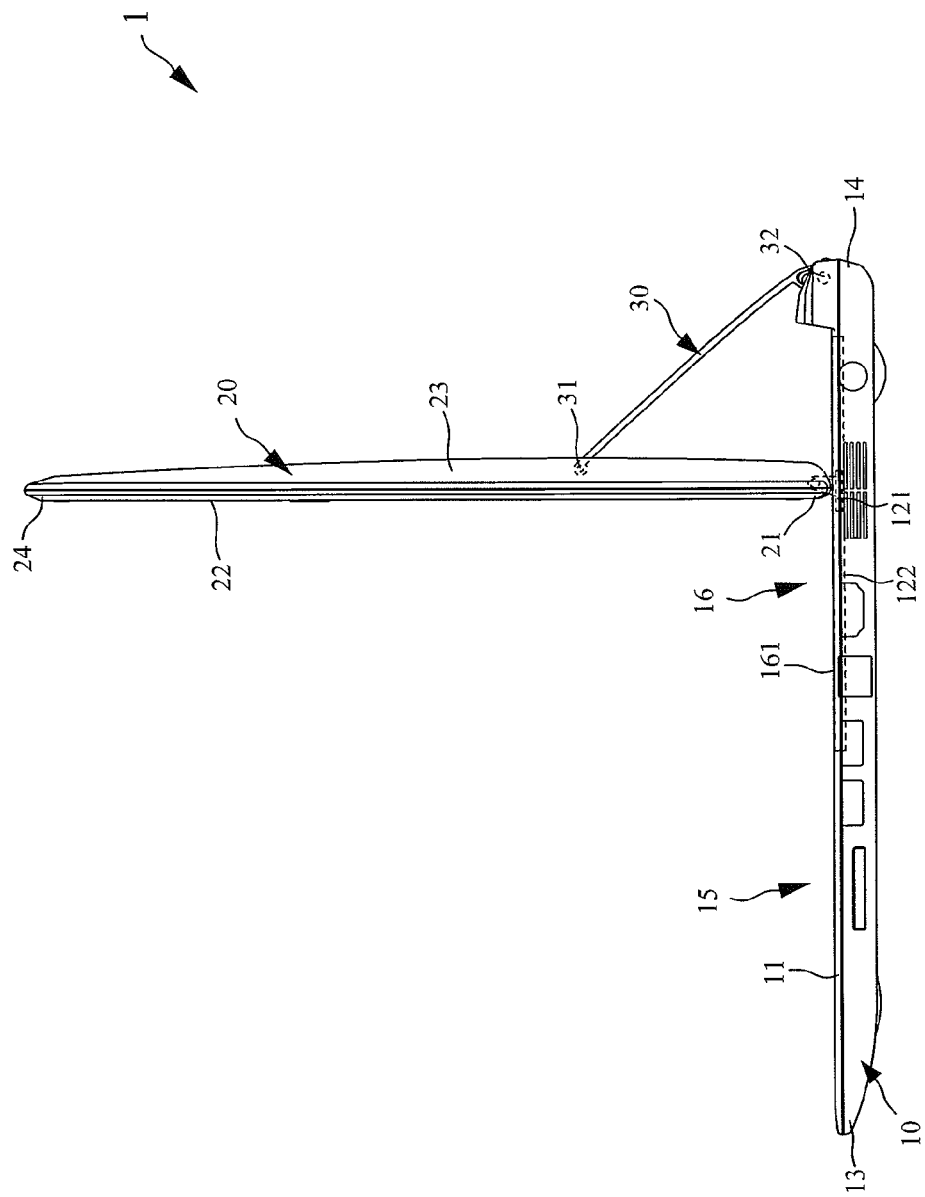
FIG. 8(b) illustrates a schematic view of the first embodiment of the portable computer of the present invention switched from the closed state to an open state.
Figure 8C:
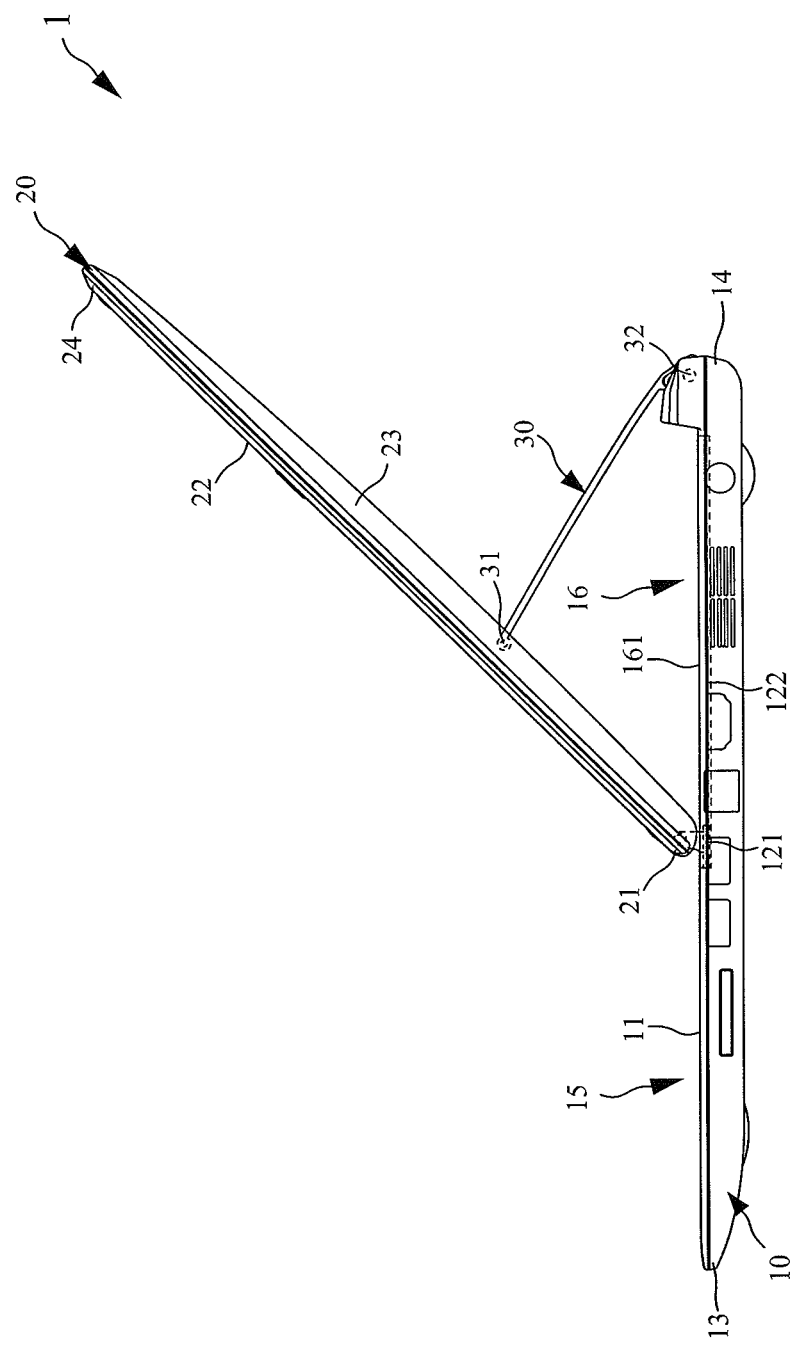
FIG. 8(c) illustrates a schematic view of the first embodiment of the portable computer of the present invention in the open state.

Please refer to FIG. 8(a), FIG. 8(b), and FIG. 8(c). FIG. 8(a) illustrates a schematic view of the first embodiment of the portable computer 1 in a closed state; FIG. 8(b) illustrates a schematic view of the first embodiment of the portable computer 1 switched from the closed state to an open state; and FIG. 8(c) illustrates a schematic view of the first embodiment of the portable computer in the open state. Please note that the structures and the operations of the portable computer 1 of the present invention are illustrated by the first embodiment of the present invention, but other embodiments of the present invention can be applied to execute the same operations; and it is not limited to the present embodiment.

As shown in FIG. 8(a), when the portable computer 1 is in a closed state, the display module 20 overlaps with the base 10 and is pivotally connected to the sliding block 121 via the connecting end 21, at this time the display plane 22 of the display module 20 is facing the base 10; the support element 30 also overlaps with the display module 20 and is pivotally connected to the rear end 14 of the base 10 and the display module 20 via the first fixed end 31 and the second fixed end 32 respectively. In this embodiment, when the portable computer 1 is in the closed state, the connecting end 21 of the display module 20 and the second fixed end 32 of the support element 30 are on different axes substantially parallel with each other, and the length of the support element 30 is longer than the distance between the connecting end 21 of the display module 20 and the first fixed end 31 of the support element 30. However, based on different design requirements, the portable computer 1, while in the closed state, can have the connecting end 21 of the display module 20 and the second fixed end 32 of the support element 30 on the same axis to let the support element 30 have a same length as the distance between the connecting end 21 of the display module 20 and the first fixed end 31 of the support element 30.

As shown in FIG. 8(b), when the user exerts a force on the free end 24 opposite to the connecting end 21 of the display module 20 to try to open the display module 20, at first the display module 20 rotates along with the support element 30 relative to the base 10 with the second fixed end 32 serving as a pivot point; after the display module 20 rotates to a certain angle, since the support element 30 has its length not smaller than the distance between the connecting end 21 of the display module 20 and the first fixed end 31 of the support element 30, so the display module 20 can rotate relative to the support element 30 with the first fixed end 31 of the support element 30 serving as the pivot point; meanwhile, the display module 20 can rotate relative to the sliding block 121 with the connecting end 21 serving as the pivot point; and the sliding block 121 will drive the connecting end 21 of the display module 20 to slide from the second area 16 towards the first area 15.

As shown in FIG. 8(c), when the display module 20 continues to rotate with the first fixed end 31 of the support element 30 serving as the pivot point, and the sliding block 121 drives the connecting end 21 of the display module 20 to slide towards the first area 15 to a suitable position (such as the end of the sliding rail 122), then the portable computer 1 is in an open state. At this time the display module 20 has rotated to a suitable angle relative to the base 10, with the display place 22 of the display module 20 facing the user. The display module 20 is supported by the support element 30 to form a tilted angle relative to the base 10.

On the other hand, when the user tries to close the portable computer 1, the user can pull the free end 24 of the display module 20 so that the display module 20 is able to rotate around the first fixed end 31 of the support element 30 with the first fixed end 31 serving as the pivot point; wherein the connecting end 21 will be driven by the sliding block 121 to slide towards the rear end 14 of the base 10 until it slides to the other end of the sliding rail 122, at this time the display module 20 rotates around the second fixed end 32 of the support element 30 to return to the closed state.

Therefore, the portable computer 1 only needs to use the sliding assembly 12 disposed at the central position to complete opening/closing functions for the display module without using any complicated linkage elements or structures, thereby reducing the number of required elements and further shrinking the size of the portable computer 1. Besides, the sliding assembly 12 is hidden below the slit 162 of the second area 16 to let the display module 20 stay close to the surface 161 of the second area 16, so the portable computer 1 looks integrated and consistent and eliminates the possibility of hurting the user's finger during opening/closing operations.

Specifically, in the embodiments, the sliding assembly 12 is disposed in the central position of the portable computer 1 and does not take up spaces on both sides of the base 10 and the display module 20. With this design, the user can use only one hand to hold the middle of the free end 24 of the display module 20, which corresponds to the position of the sliding assembly 12, to flip or slide the display module 20 smoothly. During this process, the display module 20 can maintain a stable sliding movement to facilitate operations. Furthermore, the user can initiate the opening process by flipping the display module 20 to let the display module 20 slide to a fixed position automatically, wherein the display module 20 is supported by the support element 30 to keep stable without shaking when the user perform touch operations on the display module 20.

In the previous embodiments, each portable computer 1 comprises a single support element 30 disposed at a central position relative to a sliding assembly 12 to achieve the object of the present invention. However, the present invention can have other implementations depending on different user requirements, effects, and mechanism designs, such the number of the elements, the placement of the elements, and variations of the size, etc. should be view as included in the scope of the present invention. Please note that the sliding block structures using in each of below embodiments of the portable computer is illustrated by the sliding block 121 of the sliding assembly 12 of the first embodiment of the present invention, but the sliding block 121 can be by any other sliding block 121a, 121b, 121c or similar structures; and it is not limited to the present embodiment.

Figure 9A:
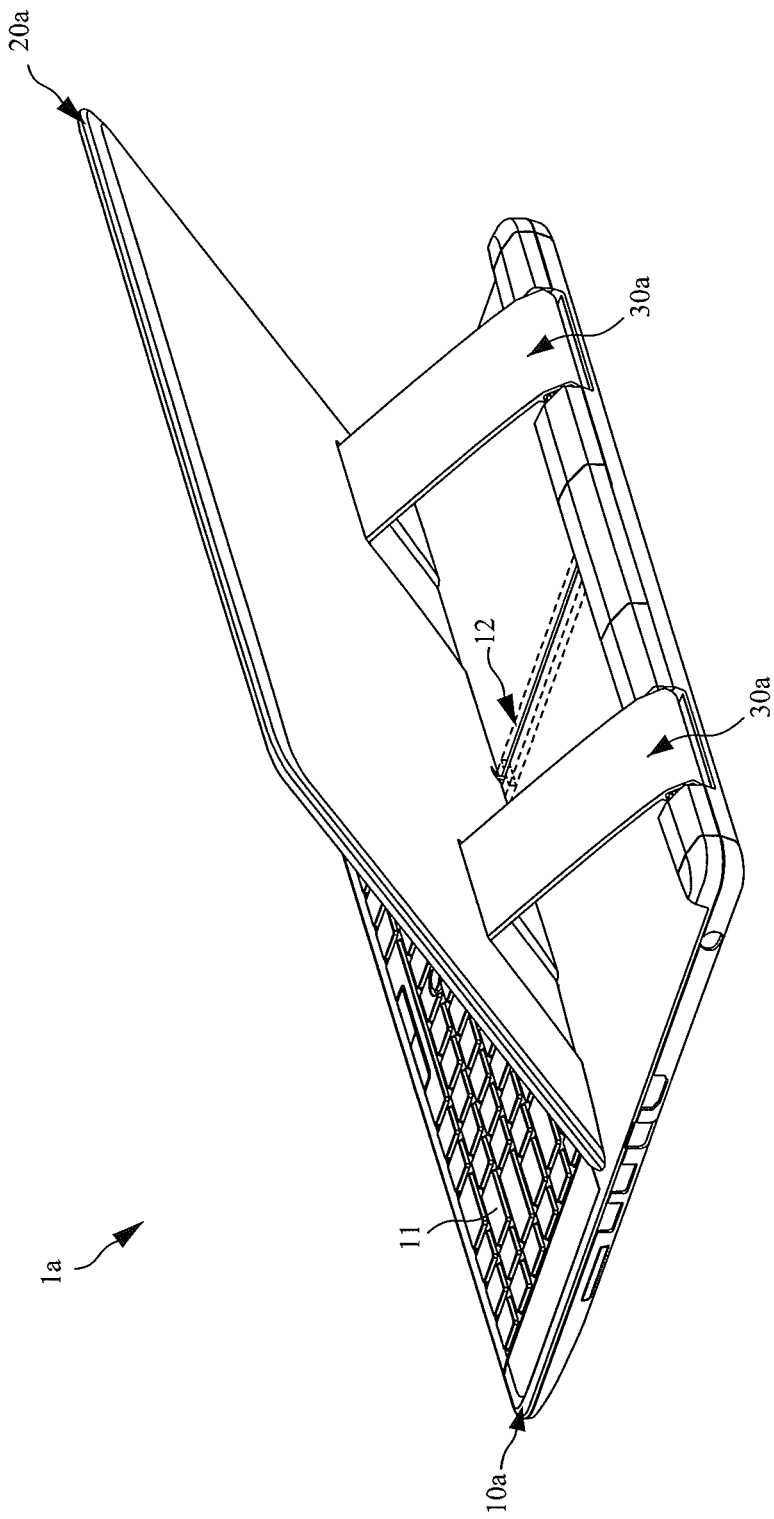
FIG. 9(a) illustrates a schematic view of a second embodiment of the portable computer of the present invention.
Figure 9B:
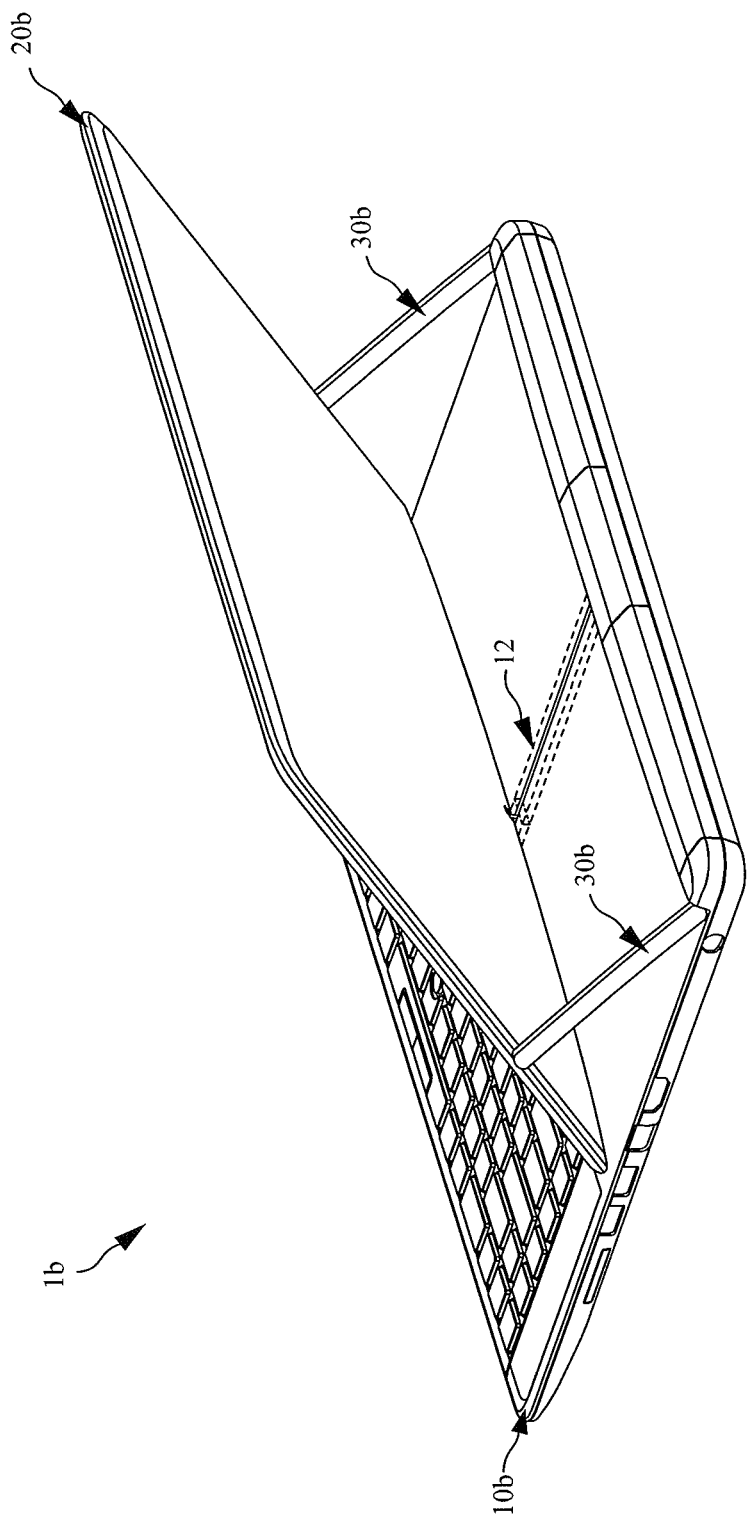
FIG. 9(b) illustrates a schematic view of a third embodiment of the portable computer of the present invention.

For example, please refer to both FIG. 9(a) and FIG. 9(b). FIG. 9(a) illustrates a schematic view of a second embodiment of the portable computer 1a of the present invention; FIG. 9(b) illustrates a schematic view of a third embodiment of the portable computer 1b of the present invention. Alternatively, the portable computer can use more than one support element to support and stabilize the display module, wherein the support elements can be disposed at various positions. As shown in FIG. 9(a), in this embodiment, the portable computer 1a comprises two support elements 30a arranged in parallel and disposed at two sides of the central sliding assembly 12 respectively to form a symmetrical structure. Each support element 30a has its one end pivotally connected to a plane of the display module 20a other than the display face, and the other end pivotally connected to the rear end of the base. By adding additional support elements (point of support), the present invention can stably support the display module 20a in a sliding movement when it is opening or closing.

Also as shown in FIG. 9(b), this embodiment is a variation of the previous embodiment, wherein the portable computer 1b comprises two support elements 30b disposed at two opposite sides near the rear end, the support elements 30b are formed in a long stick-like shape and implemented as connecting rods for reducing the installation space and simplifying the assembling work, thereby enhancing the operations of the display module 20b. However, in other embodiments, the present invention can have various implementations for a plurality of support elements.

Figure 10:
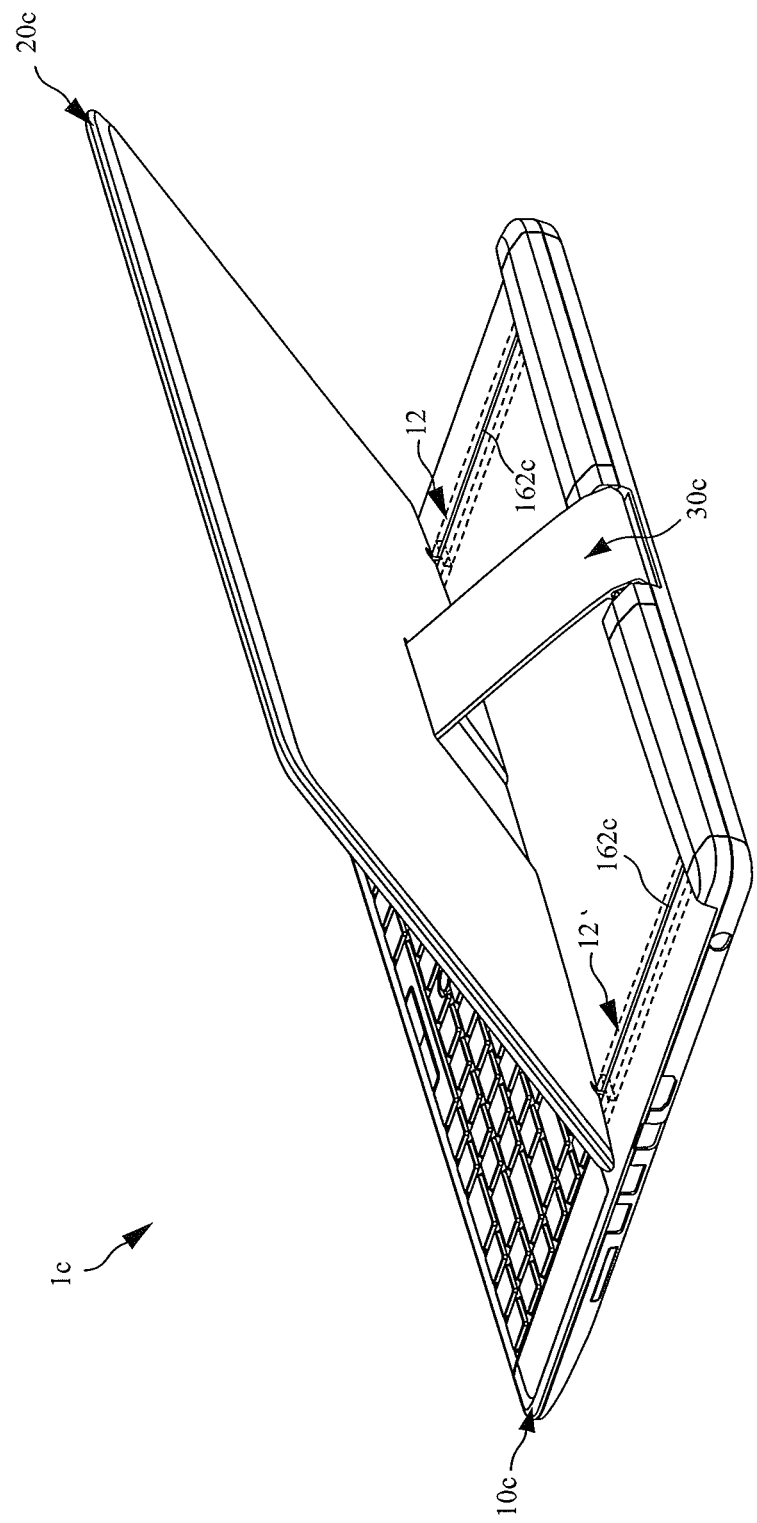
FIG. 10 illustrates a schematic view of a fourth embodiment of the portable computer of the present invention.

Please refer to FIG. 10 for a schematic view of a fourth embodiment of the portable computer 1c of the present invention. Alternatively, in addition to different implementation for the support element, the present invention can also adjust the position of the sliding assembly, the number and positions of slits in the surface of the base to provide various functions. As shown in FIG. 10, in this embodiment, the portable computer 1c comprises two sliding assemblies 12 disposed at two sides of a single support element 30c respectively, and two slits 162c disposed at the base 10e to correspond to the two sliding assemblies 12, wherein the two sliding assemblies 12 and the two slits 162c forms a parallel symmetric structure. Therefore, when the display module 20c is opening or closing, the two sliding assemblies 12 can help to stabilize the sliding movement of the display module 20c.

Those who skilled in the art can easily know that the three embodiments shown in FIG. 9(a) to FIG. 10 can be further combined to form a portable computer which comprises two support elements and two sliding assemblies, therefore, it will not be described in detail.

Figure 11:
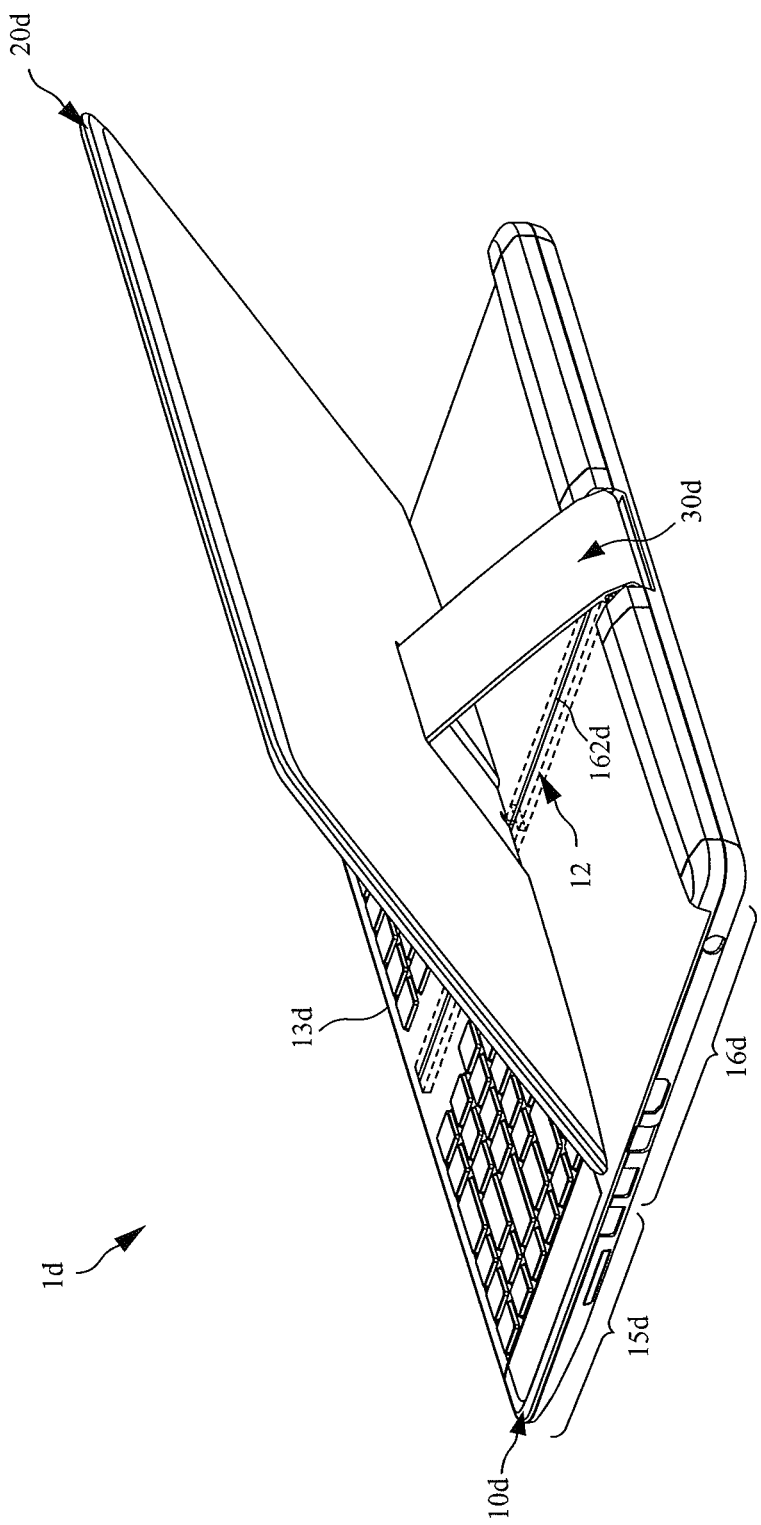
FIG. 11 illustrates a schematic view of a fifth embodiment of the portable computer of the present invention.

Please refer to FIG. 11 for a schematic view of a fifth embodiment of the portable computer 1d of the present invention. The moving distance of the sliding assembly and the length of the corresponding slit can be adjusted according to various design needs. As shown in FIG. 11, in this embodiment, the sliding assembly 12 of the portable computer 1d and a corresponding slit 162d extend from a second area 16d of a base 10d to a first area 15d of the base 10d for extending a sliding distance of a display module 20d and increasing a range of the tilted angle of the display module 20d. Even more, the display module 20d could lie flat on the base 10d to enhance versatility and capability of the portable computer 1d. Based on applications and user requirements, the sliding assembly 12 and the corresponding slit 162d can choose to extend to a part or all (that is, approaching the position of a first end 13d) of the first area 15d; and the extended slit can have any characteristics shown in FIG. 9(a) to FIG. 10 or their combination.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A portable computer, comprising:
a base comprising, between a front end and a rear end, a first area disposed at a front side of the base and a second area disposed at a rear side of the base;
a display module comprising a connecting end, a display face, and a support plane opposite to the display face; and
at least one supporting element, each supporting element comprising a first fixed end and a second fixed end, the first fixed end being pivotally connected to a portion of the display module other than the display face so that the display module is able to rotate relative to the supporting element; the second fixed end being pivotally connected to the rear end of the base or a proximity of the rear end of the base so that the supporting element is able to rotate relative to the base; and
at least one sliding assembly, each sliding assembly comprising a sliding block and a sliding rail, the sliding rail being disposed at least in the second area of the base, the sliding block being connected with the connecting end of the display module and sliding along the sliding rail, wherein the sliding block comprises at least one stable structure for at least decreasing a gap between the sliding block and the sliding rail;
whereby, when the display module is opened and rotated to a suitable angle relative to the base via the second fixed end of the support element, the display module further rotates around the first fixed end with the first fixed end serving as a pivot point and simultaneously drives the connecting end to move from the second area towards the first area to a suitable position along with the sliding element; and then the display module is supported by the support element to keep a suitable tilted angle.

2. The portable computer as claimed in claim 1, wherein the first area is disposed with a keyboard.

3. The portable computer as claimed in claim 1, wherein the supporting element has a length not smaller than a distance between the connecting end of the display module and the first fixed end of the supporting element.

4. The portable computer as claimed in claim 1, wherein the sliding block further comprises a pivoting portion, a sliding portion, and a connecting portion, the sliding portion is connected to the pivoting portion via the connecting portion, and the connecting end of the display module is pivotally connected to the sliding block via the pivoting portion; the sliding portion is disposed within the sliding rail and the at least one sliding auxiliary structure is disposed on the sliding portion.

5. The portable computer as claimed in claim 4, wherein the base further comprises a surface having a slit; the sliding rail is disposed below the surface, and the connecting portion of the sliding block goes through the slit so that the pivoting portion and a part of the connecting portion protrude out of the surface; the slit has a width smaller than that of the sliding portion.

6. The portable computer as claimed in claim 5, wherein the pivoting portion and the surface of the base are spaced apart by a spacing.

7. The portable computer as claimed in claim 1, wherein the at least one stable structure is at least one elastic arm structure comprising a arm body and a protruding structure disposed in the arm body, the arm body extending outward from one side of the sliding portion, the protruding structure being disposed towards a bottom side of the sliding portion in contact with one side of the slide rail, and the protruding structure has a height lower than the bottom side.

8. The portable computer as claimed in claim 7, wherein the protruding structure is a convex, a protruding stripe, or a bump.

9. The portable computer as claimed in claim 4, wherein the sliding portion further comprises at least one groove, and the stable structure is at least one elastic sheet structure disposed on an outer surface of the sliding portion, each elastic sheet structure comprising at least one protruding structure, each protruding structure being protruding from the outer surface of the sliding portion and correspondingly to the location of each groove.

10. The portable computer as claimed in claim 9, wherein the elastic sheet structure is a pair of ring-shaped elastic sheets trapped on two sides of the sliding portion, the grooves are disposed respectively on upper and lower surfaces of the sliding portion, and the protruding structures are disposed respectively on upper and lower surfaces of each ring-shaped elastic sheet corresponding to each groove.

11. The portable computer as claimed in claim 4, wherein the sliding assembly further comprises at least one positioning element, each positioning element is disposed at a fixed point in the sliding rail, and the sliding portion further comprises a positioning portion, a positioning effect can be provided via the interference of each positioning element and the positioning portion as the sliding block slides to the fixed point.

12. The portable computer as claimed in claim 11, wherein the positioning element comprises at least one positioning structure, and the sliding rail comprises at least one hole disposed corresponding to the position of the fixed point; the positioning structure of the positioning element can pass through the hole and be protruded in the sliding rail, so the sliding portion can be positioned by the interference of the positioning portion of the sliding portion and the positioning structure.

13. The portable computer as claimed in claim 1, wherein when the display module overlaps with the base in a closed state, the connecting end of the display module and the second fixed end of the supporting element remain on the same axis.

14. The portable computer as claimed in claim 1, wherein when the display module overlaps with the base in a closed state, the connecting end of the display module and the second fixed end of the supporting element are respectively on different axes substantially parallel with each other.

15. The portable computer as claimed in claim 4, wherein the connecting portion and the sliding portion are pivotally connected with each other.

16. The portable computer as claimed in claim 4, wherein the connecting portion comprises an extendable structure and a length of the connecting portion can be adjusted via the extendable structure.

17. The portable computer as claimed in claim 5, wherein the surface having the slit corresponds to the second area; and the sliding rail is disposed correspondingly below the surface of the second area and corresponding to the slit.

18. The portable computer as claimed in claim 5, wherein the surface having the slit comprises the second area and at least part of or all of the first area; and the sliding rail is disposed correspondingly below the surface comprising the second area and at least part of or all of the first area and corresponding to the slit.

19. The portable computer as claimed in claim 1, wherein the at least one supporting element comprises two support elements arranged in parallel.

20. The portable computer as claimed in claim 1, wherein the at least one sliding assembly comprises two sliding assemblies parallel to each other and spaced apart, the two sliding rails are disposed in parallel at least in the second area, and each sliding block is respectively and pivotally connected to the connecting end of the display module corresponding to each the sliding rail.

21. The portable computer as claimed in claim 1, wherein the at least one sliding assembly comprises a single sliding assembly disposed at the central position of at least the second area of the base; the sliding rail is disposed at least the central position of the second area of the base and the sliding block is correspondingly disposed at the central position of the connecting end of the display module.

22. The portable computer as claimed in claim 1, wherein the sliding block is rotatably and pivotally connected with the connecting end of the display module.

* * * * *